United States Patent
Murphy

[11] Patent Number: 6,059,575
[45] Date of Patent: May 9, 2000

[54] TACTILE RECOGNITION INPUT DEVICE AND OVERLAY FOR USE WITH AN INPUT DEVICE

[76] Inventor: Kevin C. Murphy, 97 Forrest St., Plaistow, N.H. 03865

[21] Appl. No.: 09/176,560

[22] Filed: Oct. 21, 1998

[51] Int. Cl.[7] .................. G09B 21/00; B41J 5/08
[52] U.S. Cl. .................. 434/112; 434/113; 434/227; 400/483; 400/485
[58] Field of Search .................. 434/112, 113, 434/114, 115, 117, 227, 167, 176, 201, 202; 400/483, 485, 478, 489; 446/143; 341/22, 27; 345/168, 160

[56] References Cited

U.S. PATENT DOCUMENTS

| | | |
|---|---|---|
| 1,823,130 | 9/1931 | Smith . |
| 2,153,231 | 4/1939 | Barnard .................. 434/176 |
| 3,318,023 | 5/1967 | Myers .................. 434/176 |
| 3,624,687 | 11/1971 | Cagnolatti .................. 434/202 |
| 3,648,394 | 3/1972 | Hepner .................. 40/331 |
| 3,781,802 | 12/1973 | Kafafian .................. 434/112 |
| 4,158,130 | 6/1979 | Speraw .................. 235/146 |
| 4,400,758 | 8/1983 | Fame .................. 200/600 |
| 4,445,871 | 5/1984 | Becker .................. 434/114 |
| 4,752,772 | 6/1988 | Litt .................. 340/712 |
| 4,755,072 | 7/1988 | Hoornweg .................. 400/490 |
| 5,096,317 | 3/1992 | Phillippe .................. 400/714 |
| 5,189,390 | 2/1993 | Fagard .................. 340/407 |
| 5,195,894 | 3/1993 | Le Blanc .................. 434/114 |
| 5,358,343 | 10/1994 | Klauber .................. 400/485 |
| 5,383,735 | 1/1995 | Smiley .................. 400/479 |
| 5,388,922 | 2/1995 | Smiley .................. 400/492 |
| 5,391,078 | 2/1995 | Murphy .................. 434/113 |
| 5,450,078 | 9/1995 | Silva et al. .................. 341/23 |
| 5,536,170 | 7/1996 | Murphy .................. 434/113 |
| 5,557,269 | 9/1996 | Montane .................. 341/22 |
| 5,694,123 | 12/1997 | Selker .................. 341/22 |
| 5,774,384 | 6/1998 | Okaya .................. 364/708.1 |
| 5,880,685 | 5/1999 | Weeks .................. 341/22 |

*Primary Examiner*—Robert A. Hafer
*Assistant Examiner*—Kurt Fernstrom
*Attorney, Agent, or Firm*—Bourque & Associates, P.A.

[57] ABSTRACT

A tactile recognition input device is used by a visually impaired individual, for example, to interact with an electronic device, such as a computer. The input device includes a plurality of activation keys movable in a direction generally parallel to the input device and preferably away from the individual to activate the input device and transmit input signals. Each of the activation keys includes a tactilely recognizable region including, for example, a Braille character. A tactile recognition overlay is used with an existing input device, such as a membrane computer keyboard. The overlay includes an overlay member having a plurality of depressible portions that are movable to below the overlay member to activate input regions on the input device. Activation keys are disposed on the overlay member over each of the depressible portions and are movable in the direction generally parallel to the input device. When one of the activation keys is moved, the activation key engages the corresponding depressible portion and moves the depressible portion to contact the corresponding input region. The tactilly recognizable region can be disposed on a surface of the activation keys or on a surface of tactile recognition blocks removably coupled to the activation keys.

23 Claims, 4 Drawing Sheets

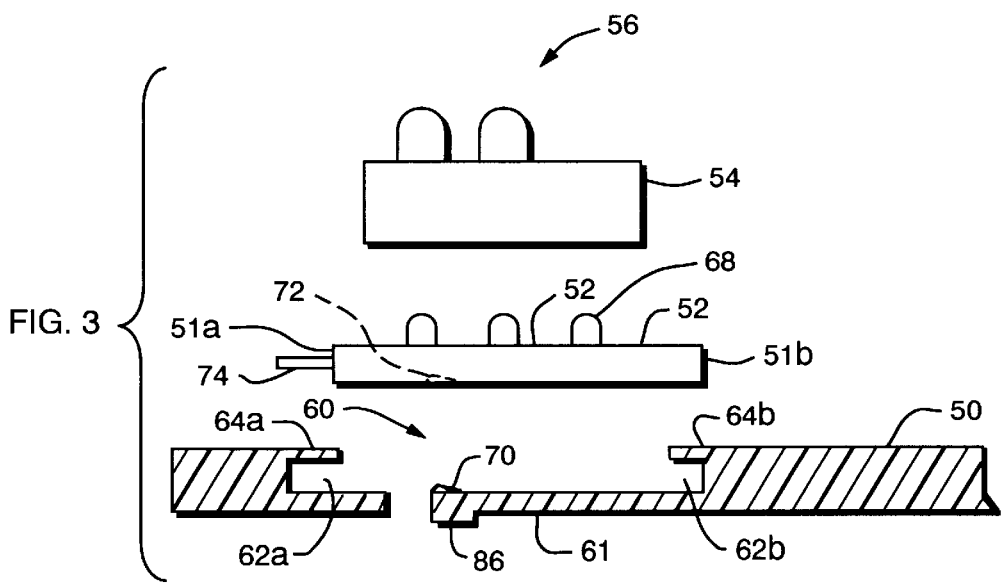
FIG. 3
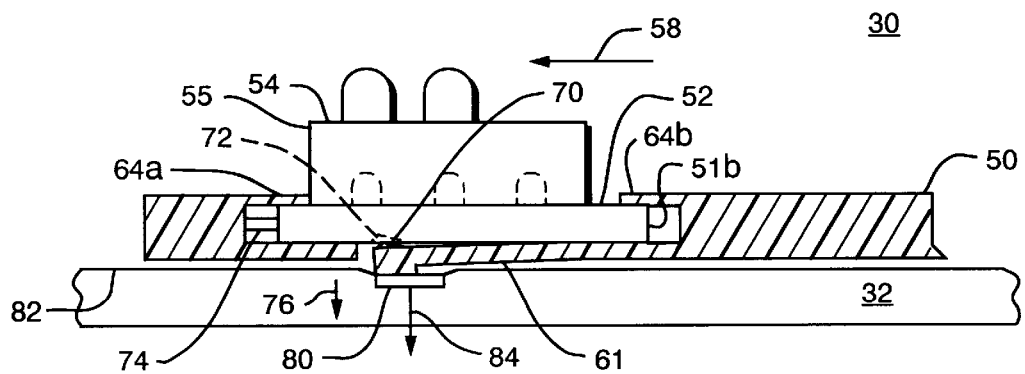
FIG. 6
FIG. 7

TACTILE RECOGNITION INPUT DEVICE AND OVERLAY FOR USE WITH AN INPUT DEVICE

FIELD OF THE INVENTION

The present invention relates to a tactile recognition teaching and communication system for use by a visually impaired individual, and more particularly, to a tactile recognition input device and a tactile recognition overlay for use with an existing input device.

BACKGROUND OF THE INVENTION

Many electronic and other devices require a user to interact with or control the device by depressing keys or otherwise activating input regions on a keyboard or other input device. Keyboards or other input devices are often marked with visual indicia to allow a user to know which key must be depressed or activated. Computers, for example, are controlled using keyboards having a number of keys with alpha-numeric characters. Such visual indicia, however, is not recognizable by a visually impaired individual, and many of these devices are not adapted for use by visually impaired individuals. Thus, using input devices, such as computer keyboards, and other similar devices, such as musical instruments, is difficult and may even be impossible for many visually impaired individuals.

Computers can be useful tools for communicating with and/or teaching individuals with disabilities, if the individuals have a way of interacting with the computer. Computer keyboards have been designed for individuals with motor difficulties from such disabilities as cerebral palsy, mental retardation, and brain trauma. One example is the keyboard available from Intellitools, Inc. of Novato, Calif. under the name INTELLIKEYS®, which is described in greater detail in U.S. Pat. No. 5,450,078, entitled Membrane Computer Keyboard and Method and incorporated herein by reference. This and other such keyboards, however, have had limited applications for visually impaired individuals.

One way of adapting a keyboard or input device for use by visually impaired individuals is to provide an overlay system to be placed over the keyboard or input device. One example of such an overlay system is disclosed in greater detail in U.S. Pat. No. 5,536,170 issued to the inventor of the present invention and incorporated herein by reference. The overlay has depressible portions that align with the keys or other pressure sensitive regions of the keyboard or input device. This overlay system is used with tactile recognition (e.g., Braille) blocks, such as those disclosed in U.S. Pat. Nos. 4,880,384 and 5,391,078 issued to the inventor of the present invention and incorporated herein by reference. The blocks are removably coupled to the depressible portions of the overlay such that the visually impaired individual can tactilly discern the character or indicia on the block and activate the appropriate key or input region of the input device by depressing the block and corresponding depressible portion.

Although this overlay system disclosed in U.S. Pat. No. 5,536,170 provides an interchangeable system that allows visually impaired individuals to use keyboards or other similar devices, there are some limitations. This overlay system provides for keyboard activation by depressing the tactile recognition blocks downward. Many visually impaired individuals, especially those first learning how to read Braille, will inadvertently activate the key when touching the Braille or other tactilly recognizable region and attempting to tactilly discern the Braille character. The keys may also be inadvertently activated when coupling and removing the tactile blocks. Thus, an input device or overlay that requires downward depression of a key is not ideally suited for visually impaired individuals.

Accordingly, a need exists for a tactile recognition input device, such as a computer keyboard, that reduces the tendency of visually impaired individuals to inadvertently activate the keys. There is also a need for a tactile recognition overlay to adapt existing keyboards or input devices for use by visually impaired individuals with a reduced tendency to inadvertently activate the keys.

SUMMARY OF THE INVENTION

The present invention features a tactile recognition input device for use by a visually impaired individual. The tactile recognition input device comprises an input device surface, at least one input region proximate the input device surface, at least one activation key disposed on the input device surface proximate the input region, and a tactilly recognizable region disposed on the activation key. The activation key is movable in a predetermined direction generally parallel to the input device surface to activate the input region and cause an input signal to be transmitted. The predetermined direction is preferably away from the visually impaired individual.

According to the preferred embodiment, the input device includes at least one touch activated switch, and at least one depressible member is disposed between the activation key and the touch activated switch. When the activation key is moved in the predetermined direction, the activation key engages the depressible member and causes the depressible member to engage the touch activated switch. In one example, the input device is a membrane computer keyboard having a plurality of touch activated switches and a membrane disposed over the touch activated switches.

In another embodiment, the input region and the activation key include metal regions such that the activation key moves in the predetermined direction to align the metal regions and provide a capacitive activation causing the input signal to be transmitted.

The input device preferably includes at least one tactile recognition block having the tactilly recognizable region disposed on a surface thereof and removably engaged with a tactile recognition block engaging region on the activation key.

In another embodiment, the tactilly recognizable region is disposed on a surface of the activation key. In one example, the tactilly recognizable region represents an alpha-numeric character, such as a Braille character.

The present invention also features a tactile recognition interface overlay for use by a visually impaired individual with an input device having at least one touch activated switch. The overlay comprises an overlay member having at least one depressible member movable below a plane of the overlay member to engage a respective one of the plurality of touch activated switches. The overlay also comprises an activation key slidably coupled to the overlay member over each depressible member and slidable in a predetermined direction generally parallel to the overlay member to engage the depressible member, causing the depressible member to move below the plane of the overlay member. The activation key includes a tactilly recognizable region disposed thereon. In one embodiment, the tactilly recognizable region is disposed on a tactile recognition block removably coupled to tactile recognition block engaging members on the activation key.

According to the preferred embodiment, the overlay member includes at least one recessed region for receiving the activation key. The depressible member preferably extends within a cut-out region in the overlay member and includes a ramped portion on a top surface, for engaging the activation key such that the depressible member moves to below the plane of the overlay member when the activation key slides in the predetermined direction and engages the ramped portion. In one example, the ramped portion is a protruding ramped portion protruding from the top surface of the depressible member, and the activation key includes a recessed ramped portion recessed in a bottom surface of the activation key for receiving the protruding ramped portion. The activation key further includes a biasing portion at one end for biasing the activation key toward an inactivated position. In one embodiment, the overlay member and activation keys are provided in an unassembled condition.

DESCRIPTION OF THE DRAWINGS

These and other features and advantages of the present invention will be better understood by reading the following detailed description, taken together with the drawings wherein:

FIG. 3 is an exploded, partially cut-away view of the overlay member, activation key and tactile recognition block, according to one embodiment of the present invention;

FIG. 6 is a partially cross-sectional view of the overlay with the activation key in an inactivated position, according to one embodiment of the present invention;

FIG. 7 is a partially cross-sectional view of the overlay with the activation key in an activated position, according to one embodiment of the present invention.

DETAILED DESCRIPTION OF THE PREFERRED EMBODIMENT

Figure 1:
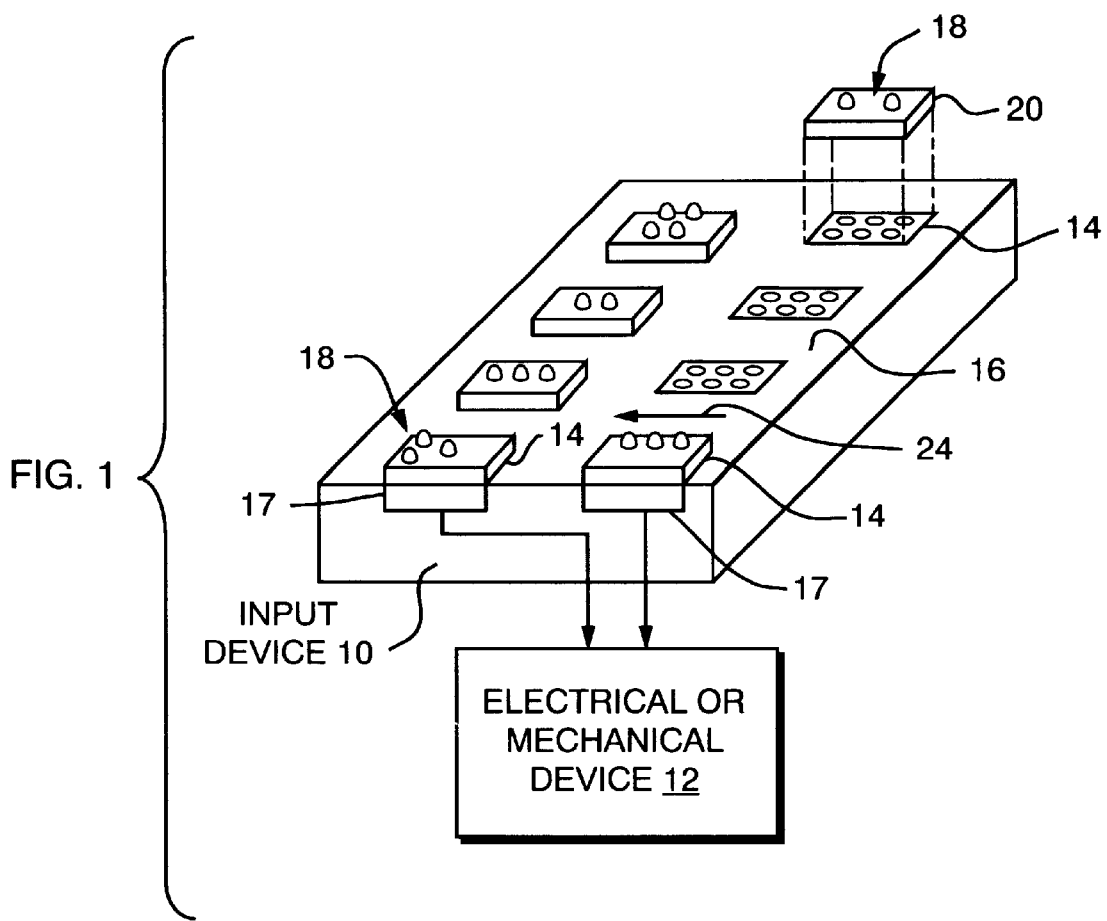
FIG. 1 is a schematic diagram of a tactile recognition input device, according to the present invention.

A tactile recognition input device 10, FIG. 1, according to the present invention, is used by visually impaired individuals to interact with or control an electronic or mechanical device 12. In one example, the input device 10 is a computer keyboard coupled to a computer. Alternatively, the input device 10 includes other types of pressure sensitive or touch activated devices, such as a musical keyboard or telephone.

The input device 10 includes a plurality of activation keys 14 disposed on an input device surface 16 and movable in a predetermined direction generally parallel to the surface 16 as indicated by arrow 24. The input device 10 also includes corresponding input regions 17 including, for example, touch activated switches or other means for transmitting an input signal to the device 10 when activated by the activation keys 14. A tactilly recognizable region 18, such as a Braille character, is disposed on each of the activation keys 14.

In one example, the tactilly recognizable regions 18 are disposed on tactile recognition blocks 20, such as the type disclosed in U.S. Pat. Nos. 4,880,384 and 5,391,078, which are removably coupled to the activation keys 14. The tactile recognition blocks 20 can be interchangeably coupled to the input device 10 to form various combinations of letters, words, phrases, symbols and the like. The tactile recognition blocks 20 are also easily re-arranged to form any combination of letters, words, phrases, symbols, and the like without disrupting the user and without having to replace the input device 10. Alternatively, the tactilly recognizable region 18 is disposed directly on a surface of the activation keys 14. The present invention further contemplates having a blank surface on the blocks 20 or keys 14 onto which the user can attach various textures, symbols or any other regions recognizable by touch.

When one of the activation keys 14 is activated by moving the key generally parallel to the input device 10 in the direction of arrow 24, the input region 17 transmits input signals to the device 12. Thus, the visually impaired user is not likely to inadvertently transmit input signals by depressing the activation keys 14 when feeling the tactilly recognizable regions 18 on the activation keys 14. Also, the tactile recognition blocks 20 can be coupled to or removed from the activation keys 14 without inadvertently activating the activation keys 14. The activation keys 14 preferably move in a direction upward or away from the visually impaired user. When feeling the tactilly recognizable region 18, for example, to read the Braille characters, the visually impaired user tends to pull in a direction downward or toward the individual. Requiring an activation movement of the activation keys 14 upward or away from the user therefore further minimizes inadvertent activation. The input regions 17 transmit the input signals according to any technique known to those skilled in the art for use in keyboards or other types of input devices.

Figure 2:
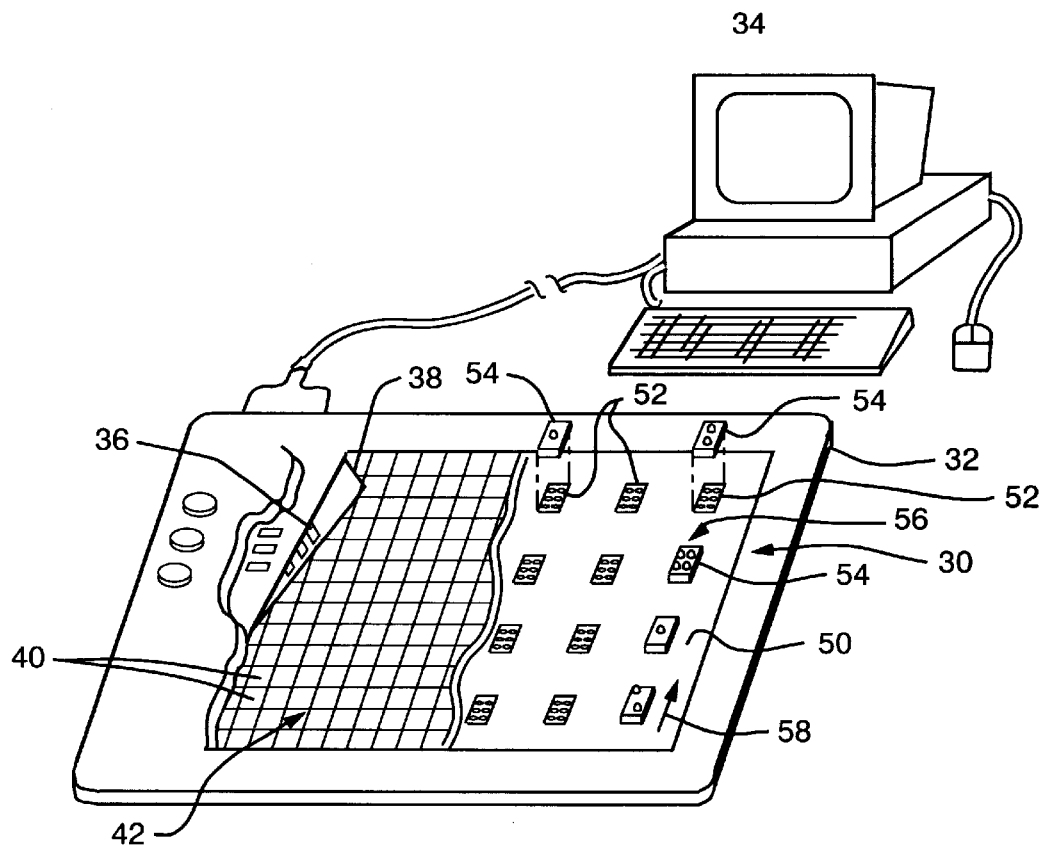
FIG. 2 is a partially cross-sectional perspective view of a tactile recognition overlay used with a membrane computer keyboard, according to one embodiment of the present invention.

According to one embodiment of the present invention, a tactile recognition overlay 30, FIG. 2, is used with an existing keyboard or input device 32. In one example, the overlay 30 can be used with a membrane computer keyboard, such as the type sold under the name INTELLIKEYS®, which is coupled to a computer 34. In this example, a coded interface 36 is provided on a separate overlay sheet 38 used with the overlay 30 or on the overlay 30 itself (not shown). The coded interface 36 includes predetermined data readable by the input device 32 to indicate the type of overlay 30 being used, as disclosed in greater detail, for example, in U.S. Pat. No. 5,450,078. The present invention also contemplates an overlay 30 that can be used with other types of computer keyboards or input devices.

The input device 32 includes a plurality of input regions 40 that transmit the input signals when activated. In the exemplary embodiment, the input regions 40 include touch activated switches covered by the membrane of the membrane computer keyboard, as described in greater detail below. The separate overlay sheet 38 preferably includes a grid 42 used to locate the input regions 40. The overlay 30 includes an overlay member 50 and a plurality of activation keys 52 slidably coupled to the overlay member 50. In one example, the overlay member 50 is made of ABS and the activation keys 52 are made of a nylon-like polymer.

Each of the activation keys 52 corresponds to a selected input region 40 on the input device 32 as determined, for example, using the grid 42 on the separate overlay sheet 38. The activation keys 52 are movable generally parallel to the overlay member 50 in the direction of arrow 58 and preferably upward or away from the visually impaired individual to activate the corresponding input regions 40. Tactile recognition blocks 54 having tactilely recognizable regions 56, such as Braille characters or other tactilely recognizable symbols, are removably coupled to the activation keys 52 to create words, phrases, patterns and the like on the overlay 30. Alternatively, the tactilely recognizable region 56 can be formed directly on a surface of the activation key 52.

According to the preferred exemplary embodiment, the overlay member 50, FIG. 3, includes a recessed region 60 for slideably receiving each activation key 52 and includes a depressible member 61 within the recessed region 60 that is movable to below the overlay member 50. First and second ends 51a, 51b of each activation key 52 are received in respective first and second cavities 62a, 62b formed by first and second lips 64a, 64b of the overlay member 50 to retain the activation key 52 in the recessed region 60. Although the exemplary embodiment discloses the recessed region 60 for receiving the activation key 52 with lips 64a, 64b for retaining the activation key 52 in the recessed region 60, the present invention also contemplates other types of slots or retaining members for slidably receiving and retaining the activation key 52. The overlay 30 can be provided having the activation keys 52 assembled in the overlay member 50 and/or with separate activation keys 52 for assembly by the user. Although removable activation keys 52 can be replaced more easily, the present invention also contemplates activation keys 52 that are slideably coupled to the overlay member 50 and are not removable.

Figure 4:
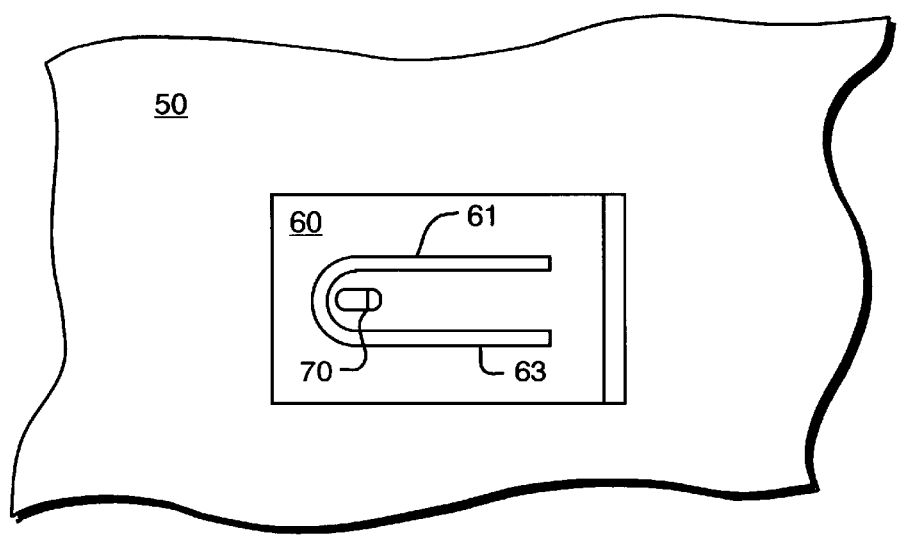
FIG. 4 is a top plan view of the overlay member and depressible portion, according to one embodiment of the present invention.

The depressible member 61, FIG. 4, extends within a cut-out region 63 in the overlay member 50 and is preferably one-piece with the overlay member 50. Alternatively, the depressible member 61 can be a separate piece disposed within the cut-out region 63 and movable to below the overlay member 50. According to a further alternative, the activation key 52 can include a portion (not shown) that moves through an aperture in the overlay member 50 and below the overlay member 50 to activate the input region.

The depressible member 61 preferably includes a protruding ramped portion 70 and the activation key 52 preferably includes a recessed ramped portion 72 that receives the protruding ramped portion 70. Engagement of the ramped portions 70, 72 causes the depressible member 61 to move below the overlay member 50 when the activation key is moved, as described in greater detail below. Alternatively, the activation key 52 can include a protruding ramped region and the depressible member 61 can include a recessed ramped region. In one example, the incline of the ramped portions 70, 72 is such that the depressible member 61 moves about ³⁄₁₆ in. The incline of the ramped portions 70, 72 can be adjusted to increase or decrease the movement of the depressible member 61, thereby increasing or decreasing the activation sensitivity. The present invention further contemplates other mechanical expedients that cause the depressible member 61 to move generally downward when the activation key 52 is moved generally parallel to the overlay member 50.

Figure 5:
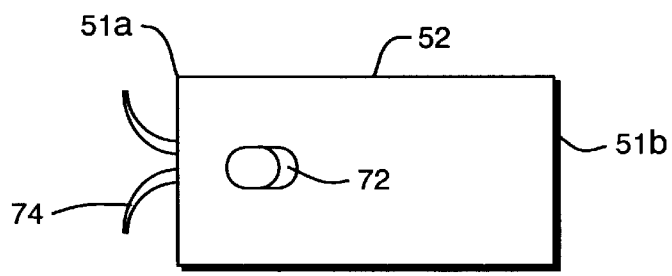
FIG. 5 is a bottom plan view of an activation key, according to one embodiment of the present invention.

The activation key 52 further includes a biasing member 74, FIG. 5, at one end 51a of the activation key 52 for biasing the activation key 52 toward an inactivated position. To assemble the overlay 30, the biasing member 74 and first end 51a of the activation key are first inserted into the first cavity 62a of the recessed region 60. The activation key 52 is then moved into the first cavity 62a until the second end 51b of the activation key 52 clears the lip 64b and enters the second cavity 62b. The tactile recognition block 54 is then be engaged with block engaging members 68 of the activation key 52.

The assembled overlay 30, FIGS. 6 and 7, is then positioned over the input device 32. In an inactivated position (FIG. 6), the biasing member 74 biases the second end 51b of the activation key 52 toward the second cavity 62b of the recessed region 60. When sufficient force is applied to the activation key 52, for example, by way of the tactile recognition block 54, the activation key 52 overcomes the force of the biasing member 74 and moves in the direction 58 to an activated position (FIG. 7). In the activated position, the recessed ramped portion 72 in the activation key 52 engages the protruding ramped portion 70 on the depressible member 61 and causes the depressible member 61 to move below the overlay member 50 in the generally downward direction 76.

According to the exemplary embodiment, the input region of the input device 32 includes a corresponding touch activated switch 80 disposed under a membrane 82 and beneath the depressible member 61. When the depressible member 61 moves below the overlay member 50, the depressible member 61 contacts the membrane 82 to activate the touch activated switch 80, causing an input signal 84 to be transmitted. The depressible member 61 preferably includes a protrusion 86 (FIG. 3) to facilitate contact with the membrane 82 and activation of the touch activated switch 80.

The tactile recognition block 54 is preferably positioned on the activation key 52 such that a face 55 of the block 54 abuts the first lip 64a and the second lip 64b retains the second end 51b of the activation key 52 when the activation key 52 is moved to the activated position (FIG. 7). Thus, the activation key 52 cannot be remove or "pop out" from the overlay member 50 when the block 54 is engaged with the activation key 52. To remove the activation key 52, the block 54 is removed and the activation key 52 is moved forward in the direction of arrow 58 until the second end 51b clears the second lip 64b and can be removed from the second cavity 62b.

Figure 8:
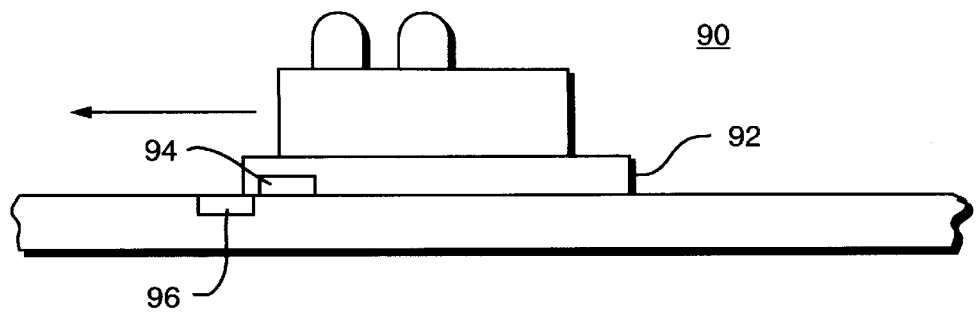
FIG. 8 is a schematic view of an input device, according to another embodiment of the present invention.

According to another embodiment, the input device 90, FIG. 8, includes activation keys 92 having an energizing region 94, and the input regions also include a corresponding energizing region 96. When the activation key 92 is moved, the energizing regions 94, 96 cause the input region of the input device 90 to be energized and transmit the input signal. For example, alignment of the energizing regions 94, 96 can energize the input region of the input device 90 by a change in capacitance, similar to the operation of a touch screen. The present invention also contemplates any other technique for energizing an input region of an input device.

In the exemplary use, the tactile recognition input device 10 (FIG. 1) or existing input device 32 having a tactile recognition overlay 30 (FIG. 2) provide an interaction between the visually impaired individual and a computer 34 (FIG. 2). A teacher or other non-visually impaired individual can also interact with the computer 34 using other conventional devices, such as a computer keyboard and/or mouse, to monitor and/or assist the visually impaired user.

One computer application of the present invention is for teaching Braille to a visually impaired individual. The tactile recognition blocks 54 can be arranged in a predetermined manner requiring the visually impaired user to tactilly discern the blocks 54 and activate the corresponding keys 52. When the user activates a block, the computer 34 responds to the user accordingly, for example, by providing an auditory response, such as playing music, speaking, or making a sound. In one example, the tactile recognition blocks are used to form a series of Braille letters and the visually impaired user is asked to form anagrams from the letters. In another example, the computer asks the user to find a specific letter or word and notifies the user of a correct or incorrect response. The non-visually impaired individual can monitor the progress of the visually impaired user and can intervene, for example, by causing the computer to give the user a positive response when needed.

In other computer applications, the visually impaired user can play computer games, play music, communicate with others (e.g., by E-mail), or participate in any other computer activity available to non-visually impaired individuals. In another computer application, the tactile recognition input device or overlay of the present invention can be used to simulate the graphic interface of a computer using blocks 20, 54 having tactilely recognizable symbols corresponding to icons on a computer screen, such as folders, a trash can, and the like. Other applications further include operating or controlling any electronically controlled device, such as an appliance.

Accordingly, the tactile recognition input device and overlay of the present invention facilitates the interaction between a visually impaired individual and a computer or other devices. The input device and overlay reduce the tendency of visually impaired users to inadvertently activate the input device while attempting to read the Braille characters or other tactilely recognizable region on the input device. The input device and overlay can also be used with tactile recognition blocks to provide an interchangeable system having numerous applications as a teaching and communications tool.

Modifications and substitutions by one of ordinary skill in the art are considered to be within the scope of the present invention which is not to be limited except by the claims which follow.

What is claimed is:

1. A tactile recognition input device for use by an impaired individual, said tactile recognition input device comprising:
    an input device surface;
    at least one input region proximate said input device surface, said input region including at least one touch activated switch, wherein activation of said at least one touch activated switch causes an input signal to be transmitted;
    at least one activation key disposed on said input device surface proximate said at least one input region, wherein said at least one activation key moves in a predetermined direction generally parallel to said input device surface to activate said at least one touch activated switch; and
    a tactilly recognizable region disposed on said at least one activation key.

2. The tactile recognition input device of claim 1 further including a plurality of input regions and activation keys.

3. The input device of claim 1, wherein said input device includes a membrane computer keyboard having a plurality of touch activated switches and a membrane disposed over said plurality of touch activated switches.

4. The input device of claim 1, further including at least one depressible member disposed between said at least one activation key and said at least one touch activated switch, wherein said at least one activation key moves in said predetermined direction generally parallel to said surface of said input device to engage said at least one depressible member and cause said at least one depressible member to engage said at least one touch activated switch.

5. The input device of claim 4 further including at least one tactile recognition block having said tactilly recognizable region disposed on a surface thereof, and wherein said activation key includes a tactile recognition block engaging region for removably engaging said tactile recognition block.

6. The input device of claim 4, wherein said tactilly recognizable region is disposed on a surface of said activation key.

7. The input device of claim 1, wherein said activation key slides in said predetermined direction away from said user.

8. The input device of claim 1 further including at least one tactile recognition block having said tactilly recognizable region disposed on a surface thereof, and wherein said activation key includes a tactile recognition block engaging region for removably engaging said at least one tactile recognition block.

9. The in device of claim 1, wherein said tactilly recognizable region represents an alpha-numeric character.

10. The input device of claim 1, wherein said alpha-numeric character includes a Braille character.

11. The input device of claim 1, wherein said input region and said activation key include energizing regions, and wherein said activation key moves in said predetermined direction such that said energizing regions cause a change in capacitance, thereby transmitting said input signal.

12. The input device of claim 1 wherein said activation key includes a biasing member for biasing the activation key toward an inactivated position.

13. A tactile recognition interface overlay for use with an input device by a visually impaired individual, said input device having at least one touch activated switch, said overlay comprising:
    an overlay member having at least one depressible member movable below a plane of said overlay member to engage a respective one of said plurality of touch activated switches; and
    an activation key slidably coupled to said overlay member over each said at least one depressible member, wherein each said activation key is slidable in a predetermined direction generally parallel to said overlay member to engage said depressible member, causing said depressible member to move below said plane of said overlay member, and wherein said activation key includes a tactilly recognizable region disposed thereon.

14. The overlay of claim 13, wherein said overlay member includes a plurality of depressible members, and further including a plurality of activation keys slidably coupled to said overlay member over respective ones of said plurality of depressible members.

15. The overlay of claim 13, wherein said overlay member includes at least one recessed region for receiving said at least one activation key.

16. The overlay of claim 13, wherein said depressible member extends within a cut-out region in said overlay member such that said depressible member is bendable to below said plane of said overlay member.

17. The overlay of claim 16, wherein said depressible member includes a ramped portion on a top surface, for engaging said activation key such that said depressible member moves to below said plane of said overlay member when said activation key slides in said predetermined direction and engages said ramped portion.

18. The overlay of claim 17, wherein said ramped portion is a protruding ramped portion protruding from said top surface of said depressible member, wherein said activation key includes a recessed ramped portion recessed in a bottom surface of said activation key, for receiving said protruding ramped portion such that said depressible member is moved to below said plane of said overlay member as said recessed ramped portion engages said protruding ramped portion on said depressible member as said activation key slides in said predetermined direction.

19. The overlay of claim 13, wherein said activation key includes a biasing portion for biasing said activation key toward an inactivated position.

20. The overlay of 13, wherein said predetermined direction is away from said visually impaired individual.

21. The overlay of claim 13, wherein said overlay member includes a coded interface including predetermined data readable by said input device.

22. The overlay of claim 13 further including at least one tactile recognition block removably coupled to a tactile recognition block engaging region on said activation key, and wherein said tactilly recognizable region is on said tactile recognition block.

23. A tactile recognition interface overlay for use with an input device by a visually impaired individual, said input device having a plurality of touch activated switches, said overlay comprising:

an overlay member having a plurality of depressible members movable below a plane of said overlay member to engage respective ones of said plurality of touch activated switches; and a plurality of activation keys adapted to be slidably coupled to said overlay member over respective ones of said plurality of depressible members such that each of said plurality of activation keys is slidable in a predetermined direction generally parallel to said overlay member to engage a respective said depressible member to cause said depressible member to move below said plane of said overlay member, and wherein said activation key includes a tactile recognition block engaging region for removably engaging a tactile recognition block having a tactilly recognizable region.

* * * * *